(12) United States Patent
Ogawa et al.

(10) Patent No.: US 8,221,921 B2
(45) Date of Patent: Jul. 17, 2012

(54) NON-AQUEOUS ELECTROLYTE BATTERY

(75) Inventors: Kenichi Ogawa, Fukushima (JP);
Hiroyuki Akashi, Kanagawa (JP);
Yoshiaki Obana, Kanagawa (JP);
Atsushi Kajita, Fukushima (JP);
Yukako Teshima, Fukuoka (JP)

(73) Assignee: Sony Corporation, Tokyo (JP)

( * ) Notice: Subject to any disclaimer, the term of this patent is extended or adjusted under 35 U.S.C. 154(b) by 1149 days.

(21) Appl. No.: 12/054,882

(22) Filed: Mar. 25, 2008

(65) Prior Publication Data

US 2008/0241660 A1    Oct. 2, 2008

(30) Foreign Application Priority Data

Mar. 26, 2007   (JP) ................. 2007-080115

(51) Int. Cl.
*H01M 2/16* (2006.01)
(52) U.S. Cl. ........ 429/249; 429/247; 429/251; 429/129; 429/145; 429/231.95; 429/231.6; 429/231.8
(58) Field of Classification Search .................. 429/249, 429/247, 251, 129, 145, 231.95, 231.6, 231.8
See application file for complete search history.

(56) References Cited

U.S. PATENT DOCUMENTS

| | | | |
|---|---|---|---|
| 4,335,193 A | 6/1982 | Doi et al. | |
| 4,650,730 A | 3/1987 | Lundquist et al. | |
| 4,731,304 A | 3/1988 | Lundquist et al. | |
| 6,447,958 B1 | 9/2002 | Shinohara et al. | |
| 2004/0234853 A1 | 11/2004 | Adachi et al. | |

FOREIGN PATENT DOCUMENTS

| | | | |
|---|---|---|---|
| JP | 52-070988 | | 6/1977 |
| JP | 63-202853 | | 8/1988 |
| JP | 03-064855 | | 3/1991 |
| JP | 07-111161 | | 4/1995 |
| JP | 08-255615 | | 10/1996 |
| JP | 10-006453 | | 1/1998 |
| JP | 10-050287 | | 2/1998 |
| JP | 10-172531 | | 6/1998 |
| JP | 10-324758 | | 12/1998 |
| JP | 2000-030686 | | 1/2000 |
| JP | 3175730 | | 4/2001 |
| JP | 2004-275845 | | 10/2004 |
| JP | 2004-327183 | * | 11/2004 |
| JP | 3721639 | | 9/2005 |
| JP | 2005-276503 | | 10/2005 |
| JP | 2006-049114 | | 2/2006 |
| JP | 03/109713 | | 3/2006 |
| JP | 2006-164761 | | 6/2006 |
| JP | 2007-048717 | | 2/2007 |
| JP | 08-287897 | | 3/2008 |
| JP | 2008-053196 | * | 3/2008 |

OTHER PUBLICATIONS

Japanese Office Action issued on Jul. 21, 2009, for corresponding Japanese Patent Application JP 2007-080115.

* cited by examiner

*Primary Examiner* — Laura Weiner
(74) *Attorney, Agent, or Firm* — K&L Gates LLP (57) ABSTRACT

A non-aqueous electrolyte battery has a cathode, an anode, an electrolyte, and a separator. The separator is a microporous resin film of a single layer made of a resin material in which at least one kind of insulating and flame-retarding fiber is dispersed in a polyolefin resin.

9 Claims, 4 Drawing Sheets

NON-AQUEOUS ELECTROLYTE BATTERY

CROSS REFERENCES TO RELATED APPLICATIONS

The present application claims priority to Japanese Patent Application JP 2007-080115 filed in the Japanese Patent Office on Mar. 26, 2007, the entire contents of which being incorporated herein by reference.

BACKGROUND

The present application relates to a non-aqueous electrolyte battery and, more particularly, to a non-aqueous electrolyte battery having a microporous separator.

Owing to the remarkable development of a recent portable electronic technique, cellular phones and notebook-sized computers have been recognized as fundamental techniques which support a society of highly advanced information technologies. Further, studies and development regarding the realization of advanced functions of those apparatuses are vigorously being made. Electric power consumption of those apparatuses is also increasing more and more in proportion to them. On the other hand, it is demanded that those electronic apparatuses can be driven for a long time. Inevitably, it is demanded to realize a high energy density of a secondary battery as a driving power source.

The higher energy density of the battery is preferable from viewpoints of an occupation volume, a weight, and the like of the battery built in the electronic apparatus. At present, since a lithium ion secondary battery has an excellent energy density, such a battery has been built in most of the apparatuses.

Ordinarily, in the lithium ion secondary battery, a lithium cobalt acid is used for a cathode, a carbon material is used for an anode, and the battery is used at an operating voltage within a range from 2.5V to 4.2V. In a unit cell, a terminal voltage can be raised to 4.2V owing to excellent electrochemical stability of a non-aqueous electrolyte material, a separator, or the like.

At present, in the lithium ion secondary battery which operates at maximum 4.2V, a cathode active material such as a lithium cobalt acid or the like which is used in such a battery merely uses a capacitance of about 60% of its theoretical capacitance. In principle, a residual capacitance can be utilized by further raising a charge voltage. Actually, for example, as disclosed in Patent Document 1 (International Publication No. 03/019713), it has been known that the high energy density can be realized by setting the voltage upon charging to 4.25V or more.

However, similar non-aqueous electrolyte batteries have been examined and is has been found out that the following "problem peculiar to the battery system" exists in the battery. That is, when the charge voltage is set to a value over 4.2V, particularly, an oxidation atmosphere near the cathode surface is enhanced, so that a non-aqueous electrolyte material or a separator which is physically come into contact with the cathode is liable to be subjected to oxidation decomposition. Eventually, a resistance in the battery increases and, particularly, high-temperature characteristics or the like deteriorate.

In the case of a battery whose charge voltage has been set to a value over 4.2V, since a risk caused by a wrong using method is larger than that in the case of a battery in the related art, it is necessary to further improve safety.

SUMMARY

It is, therefore, desirable to provide a non-aqueous electrolyte battery whose charge voltage has been set to a value over 4.2V, wherein oxidation decomposition of a separator is suppressed and high safety is provided.

According to an embodiment, there is provided a non-aqueous electrolyte battery comprising a cathode, an anode, an electrolyte, and a separator, wherein the separator is a microporous resin film of a single layer made of a resin material in which at least one kind of insulating and flame-retarding fiber is dispersed in a polyolefin resin.

It is preferable that the insulating and flame-retarding fiber mentioned above is a glass fiber or an aromatic polyamide fiber (hereinbelow, properly referred to as an aramid fiber), a content of the glass fiber lies within a range from 0.5 wt % or more to 30 wt % or less, and a content of the aramid resin fiber lies within a range from 0.5 wt % or more to 50 wt % or less.

It is preferable that the polyolefin resin mentioned above is polyethylene PE, polypropylene PP, or a mixture of polyethylene PE and polypropylene PP.

According to an embodiment, it is preferable that an open circuit voltage in a full charging state lies within a range from 4.25V or more to 4.55V or less.

According to an embodiment, it is preferable that a film thickness of the separator lies within a range from 5 μm or more to 25 μm or less.

According to an embodiment, it is preferable that air permeability of the separator lies within a range from 100 sec/100 cc or more to 600 sec/100 cc or less.

According to an embodiment, it is preferable that porosity of the separator lies within a range from 25% or more to 65% or less.

According to an embodiment, it is preferable that a piercing strength of the separator lies within a range from 100 gf or more to 1000 gf or less.

According to an embodiment, it is preferable that the anode contains carbon or a metal material which can dope and dedope alkaline metal ions or alkaline earth metal ions and it is preferable to use one selected from the group consisting of graphite, easy-graphitizable carbon, and non-easy-graphitizable carbon as carbon mentioned above.

According to an embodiment, by allowing the separator to contain at least one kind of insulating and flame-retarding fiber, an oxidation resistance of the separator is improved. By dispersing the flame-retarding fiber having a high melting point in the polyolefin resin, even if a battery temperature becomes high and the polyolefin resin is fused and intended to contract, since the flame-retarding fiber does not follow it, the contraction of the separator can be suppressed.

As described above, according to an embodiment, in the battery whose charge voltage has been set to the value over 4.2V, oxidation decomposition of the separator is suppressed and thermal stability of the separator can be improved. Thus, a deterioration of cycle characteristics caused by the oxidation of the separator can be suppressed. A short-circuit in the battery caused by the contraction of the separator and a thermo-runaway of a secondary battery caused by the short-circuit are prevented and the safety can be improved.

Additional features and advantages are described herein, and will be apparent from the following Detailed Description and the figures.

DETAILED DESCRIPTION

An embodiment will be described hereinbelow with reference to the drawings.

(First Embodiment)

[Structure of Non-Aqueous Electrolyte Battery]

Figure 1:
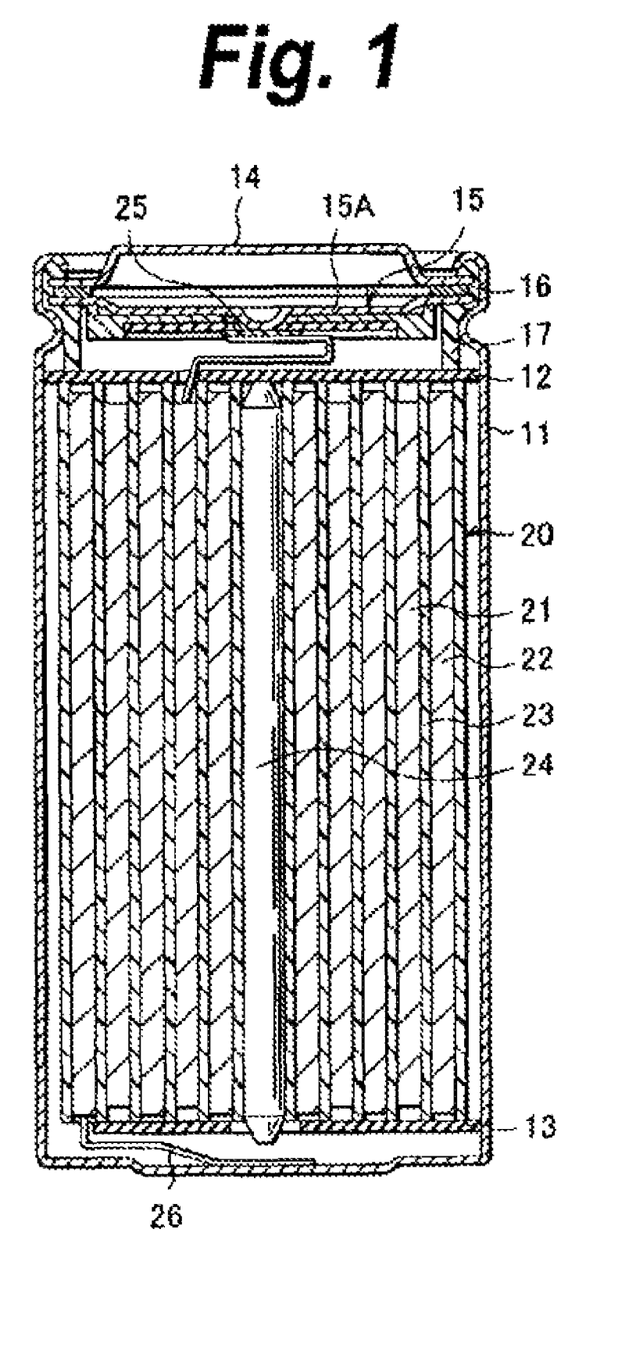
FIG. 1 is across sectional view showing a constructional example of a secondary battery according to a first embodiment.

FIG. 1 is a cross sectional view showing an example of a construction of a non-aqueous secondary battery (hereinbelow, properly referred to as a secondary battery) according to a first embodiment. This secondary battery is what is called a lithium ion secondary battery in which lithium Li is used as an electrode reactive substance and a capacitance of the anode is expressed by a capacitance component that is caused by dope and dedope of lithium. This secondary battery is what is called a cylindrical type and has a winded electrode member 20 in an almost hollow cylindrical battery can 11. The winded electrode member 20 is constructed by winding a pair of belt-shaped cathode 21 and belt-shaped anode 22 through a separator 23. The battery can 11 is made of, for example, iron Fe plated with nickel Ni. One end portion of the battery can 11 is closed and the other end portion is opened. A pair of insulating plates 12 and 13 are respectively arranged in the battery can 11 perpendicularly on a winding peripheral surface so as to sandwich the winded electrode member 20.

A battery cap 14 and a relief valve mechanism 15 and a thermally insulative resistive element (Positive Temperature Coefficient; PTC element) 16 which are provided in the battery cap 14 are attached to the open end portion of the battery can 11 by being caulked through a gasket 17. The inside of the battery can 11 is sealed. The battery cap 14 is made of, for example, the same material as that of the battery can 11. The relief valve mechanism 15 is electrically connected to the battery cap 14 through the PTC element 16. When an inner pressure of the battery is set to a predetermined value or more by an internal short-circuit, heating from the outside, or the like, a disk plate 15A is reversed, thereby disconnecting the electrical connection of the battery cap 14 and the winded electrode member 20. When the temperature rises, the PTC element 16 limits a current by an increase in resistance value, thereby preventing an abnormal heat generation caused by the large current. The gasket 17 is made of, for example, an insulating material and its surface is coated with asphalt.

The winded electrode member 20 is wound, for example, around a center pin 24 as a center. A cathode lead 25 made of aluminum Al or the like is connected to the cathode 21 of the winded electrode member 20. An anode lead 26 made of nickel Ni or the like is connected to the anode 22. The cathode lead 25 is electrically connected to the battery cap 14 by being welded to the relief valve mechanism 15. The anode lead 26 is welded to the battery can 11 and electrically connected thereto.

Figure 2:
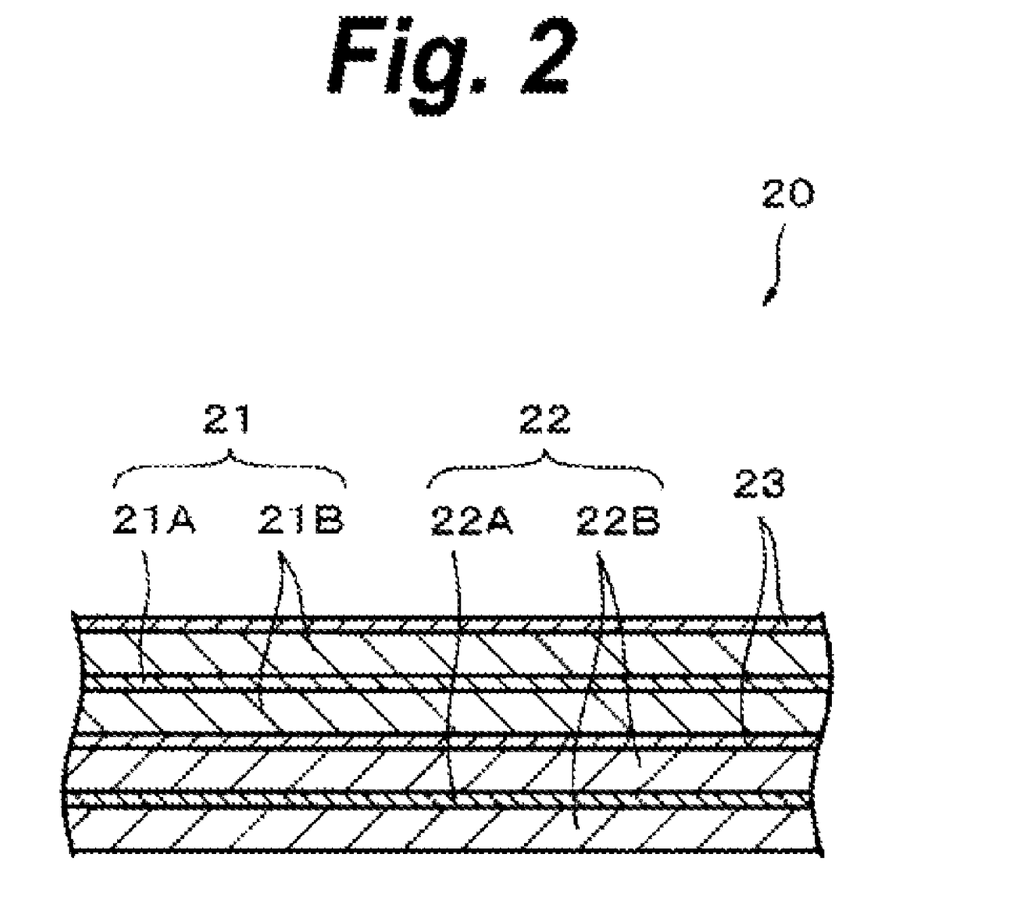
FIG. 2 is a cross sectional view showing a winded electrode member with a part enlarged in the secondary battery shown in FIG. 1.

FIG. 2 is a cross sectional view showing the winded electrode member 20 shown in FIG. 1 with a part enlarged. The cathode 21 has such a structure that, for example, cathode active material layers 21B are formed on both surfaces of a cathode collector 21A having a pair of opposite surfaces. Although not shown, the cathode active material layer 21B may be formed on only one surface of the cathode collector 21A. The cathode collector 21A is made of, for example, metal foil such as aluminum foil or the like. As a cathode active material, the cathode active material layer 21B contains, for example, one, two, or more kinds of cathode materials which can dope and dedope lithium. As necessary, the cathode active material layer 21B contains a conductive material such as graphite or the like and a binder such as polyvinylidene fluoride or the like.

[Cathode]

As a cathode material which can dope and dedope lithium, for example, a lithium containing compound such as lithium oxide, lithium phosphorus oxide, lithium sulfide, interlayer compound containing lithium, or the like is proper. Two or more kinds of them may be mixed and used. In order to raise an energy density, a lithium containing compound containing lithium, a transition metal element, and oxygen O is preferable. Among them, a lithium containing compound containing, as a transition metal element, at least one kind selected from a group having cobalt Co, nickel Ni, manganese Mn, and iron Fe is much preferable. As such a lithium containing compound, for example, there can be mentioned: a lithium composite oxide having a stratified rocksalt type structure shown in Formula I, II or III; a lithium composite oxide having a spinel type structure shown in Formula IV; a lithium composite phosphate having an olivin type structure shown in Formula V; or the like. Specifically speaking, there is $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), $Li_eFePO_4$ (e≈1), or the like.

(Formula I)

(in the Formula, M1 denotes at least one kind selected from a group having cobalt Co, magnesium Mg, aluminum Al, boron B, titanium Ti, vanadium V, chromium Cr, iron Fe, copper Cu, zinc Zn, zirconium Zr, molybdenum Mo, tin Sn, calcium Ca, strontium Sr, and tungsten W; f, g, h, j, and k indicate values within ranges of $0.8 \leq f \leq 1.2$, $0<g<0.5$, $0 \leq h \leq 0.5$, $g+h<1$, $-0.1 \leq j \leq 0.2$, and $0 \leq k \leq 0.1$, respectively; a composition of lithium differs depending on a charging/discharging state; and the value of f indicates a value in a perfect discharging state.)

(Formula II)

(in the Formula, M2 denotes at least one kind selected from a group having cobalt Co, manganese Mn, magnesium Mg, aluminum Al, boron B, titanium Ti, vanadium V, chromium Cr, iron Fe, copper Cu, zinc Zn, molybdenum Mo, tin Sn, calcium Ca, strontium Sr, and tungsten W; m, n, p, and q indicate values within ranges of $0.8 \leq m \leq 1.2$, $0.005 \leq n \leq 0.5$, $-0.1 \leq p \leq 0.2$, and $0 \leq q \leq 0.1$, respectively; the composition of lithium differs depending on the charging/discharging state; and the value of m indicates a value in the perfect discharging state.)

(Formula III)

(in the Formula, M3 denotes at least one kind selected from a group having nickel Ni, manganese Mn, magnesium Mg, aluminum Al, boron B, titanium Ti, vanadium V, chromium Cr, iron Fe, copper Cu, zinc Zn, molybdenum Mo, tin Sn, calcium Ca, strontium Sr, and tungsten W; r, s, t, and u indicate values within ranges of $0.8 \leq r \leq 1.2$, $0 \leq s < 0.5$, $-0.1 \leq t \leq 0.2$, and $0 \leq u \leq 0.1$, respectively; the composition of lithium differs depending on the charging/discharging state; and the value of r indicates a value in the perfect discharging state.)

(Formula IV)

(in the Formula, M4 denotes at least one kind selected from a group having cobalt Co, nickel Ni, magnesium Mg, aluminum Al, boron B, titanium Ti, vanadium V, chromium Cr, iron Fe, copper Cu, zinc Zn, molybdenum Mo, tin Sn, calcium Ca, strontium Sr, and tungsten W; v, w, x, and y indicate values within ranges of $0.9 \leqq v \leqq 1.1$, $0 \leqq w \leqq 0.6$, $3.7 \leqq x \leqq 4.1$, and $0 \leqq y \leqq 0.1$, respectively; the composition of lithium differs depending on the charging/discharging state; and the value of v indicates a value in the perfect discharging state.)

$$Li_zM5PO_4 \quad \text{(Formula V)}$$

(in the Formula, M5 denotes at least one kind selected from a group having cobalt Co, manganese Mn, iron Fe, nickel Ni, magnesium Mg, aluminum Al, boron B, titanium Ti, vanadium V, niobium Nb, copper Cu, zinc Zn, molybdenum Mo, calcium Ca, strontium Sr, tungsten W, and zirconium Zr; z indicates a value within a range of $0.9 \leqq z \leqq 1.1$; the composition of lithium differs depending on the charging/discharging state; and the value of z indicates a value in the perfect discharging state.)

Besides them, as a cathode material which can dope and dedope lithium, an inorganic compound such as $MnO_2$, $V_2O_5$, $V_6O_{13}$, NiS, MoS, or the like which does not contain lithium.

[Anode]

The anode 22 has such a structure that, for example, anode active material layers 22B are formed on both surfaces of an anode collector 22A having a pair of opposite surfaces. Although not shown, the anode active material layer 22B may be formed on only one surface of the anode collector 22A. The anode collector 22A is made of, for example, metal foil such as copper foil or the like.

As an anode active material, the anode active material layer 22B contains one, two, or more kinds of anode materials which can dope and dedope lithium. As necessary, the anode active material layer 22B contains a binder similar to the cathode active material layer 21B.

According to the secondary battery, an electrochemical equivalent of the anode material which can dope and dedope lithium is larger than that of the cathode 21 and the lithium metal is not precipitated in the anode 22 during the charging.

The secondary battery is designed in such a manner that an open circuit voltage upon perfect charging (that is, battery voltage) lies within a range, preferably, from 4.25V or more to 6.00V or less, much preferably, from 4.35V or more to 4.55V or less. As compared with the battery whose open circuit voltage is equal to 4.20V, when the open circuit voltage upon perfect charging is equal to 4.25V or more, even in the case of the same cathode active material, a dedoping amount of lithium per unit mass is larger. Therefore, amounts of the cathode active material and the anode active material are adjusted according to the dedoping amount and the high energy density can be obtained.

As an anode material which can dope and dedope lithium, for example, a carbon material such as graphite, non-easy-graphitizable carbon, easy-graphitizable carbon, pyrolytic carbon class, coke class, glassy carbon class, organic high molecular compound baked material, carbon fiber, activated charcoal, or the like can be mentioned. Among them, as a coke class, there is a pitch coke, a needle coke, a petroleum coke, or the like. The organic high molecular compound baked material denotes a material obtained by baking and carbonating a high molecular material such as phenol resin, fran resin, or the like at a proper temperature. A part of the organic high molecular compound baked material is classified into non-easy-graphitizable carbon or easy-graphitizable carbon. As a high molecular material, there is polyacetylene, polypyrrole, or the like. Those carbon materials are preferable because a change in crystal structure that is caused upon charging/discharging is very small, a high charge/discharge capacitance can be obtained, and good cycle characteristics can be obtained. Particularly, graphite is preferable because an electrochemical equivalent is large and the high energy density can be obtained. The non-easy-graphitizable carbon is preferable because better characteristics can be obtained. Furthermore, a carbon material in which a charge/discharge potential is low, specifically speaking, the charge/discharge potential is close to that of a lithium metal is preferable because the high energy density of the battery can be easily realized.

As an anode material which can dope and dedope lithium, a material which can dope and dedope lithium and contains at least one kind, as a component element, of a metal element and a semimetal element is also mentioned. This is because if such a material is used, the high energy density can be obtained. Particularly, if such a material is used together with the carbon material, it is much preferable because the high energy density can be obtained and the better cycle characteristics can be also obtained. The anode material may be a simple substance of the metal element or semimetal element or an alloy or compound of them may be a material containing one, two, or more kinds of phases of them in at least apart of it. In the present application, in addition to an alloy made of two or more kinds of metal elements, an alloy containing one or more kinds of metal elements and one or more kinds of semimetal elements is also incorporated. The alloy may also contain a non-metal element. There is an alloy in which a solid solution, an eutectic (eutectic mixture), or an intermetallic compound exists in its texture or two or more kinds of them coexist therein.

As a metal element or semimetal element constructing the anode material, for example, there can be mentioned: magnesium Mg; boron B; aluminum Al; gallium Ga; indium In; silicon Si; germanium Ge; tin Sn; lead Pb; bismuth Bi; cadmium Cd: silver Ag; zinc Zn; hafnium Hf; zirconium Zr; yttrium Y; palladium Pd; or platinum Pt. They may be crystalline or amorphous.

Among them, as an anode material, a material containing a metal element or a semimetal element, as a component element, of group 4B in a short period type periodic table is preferable. A material containing at least either silicon Si or tin Sn as a component element is particularly preferable. This is because according to silicon Si and tin Sn, an ability of doping and dedoping lithium Li is high and the high energy density can be obtained.

As an alloy of tin Sn, for example, there can be mentioned an alloy containing, as a second component element other than tin Sn, at least one kind selected from a group having silicon Si, nickel Ni, copper Cu, iron Fe, cobalt Co, manganese Mn, zinc Zn, indium In, silver Ag, titanium Ti, germanium Ge, bismuth Bi, antimony Sb, and chromium Cr. As an alloy of silicon Si, for example, there can be mentioned an alloy containing, as a second component element other than silicon Si, at least one kind selected from a group having tin Sn, nickel Ni, copper Cu, iron Fe, cobalt Co, manganese Mn, zinc Zn, indium In, silver Ag, titanium Ti, germanium Ge, bismuth Bi, antimony Sb, and chromium Cr.

As a compound of tin Sn or a compound of silicon Si, for example, a compound containing oxygen O or carbon C can be mentioned. The compound may contain the foregoing second component element in addition to tin Sn or silicon Si.

As an anode material which can dope and dedope lithium, another metal compound or a high molecular material can be further mentioned. As another metal compound, there can be mentioned: an oxide such as $MnO_2$, $V_2O_5$, $V_6O_{13}$, or the like; a sulfide such as NiS, MoS, or the like; or a lithium nitride such as $LiN_3$ or the like. As a high molecular material, polyacetylene, polyaniline, polypyrrole, or the like can be mentioned.

[Separator]

As a separator 23, for example, it is possible to use a microporous resin film of a single layer made of a resin material obtained by dispersing at least one kind of insulating and flame-retarding fiber in a polyolefin resin such as polyethylene PE, polypropylene PP, or the like or a mixture of those polyolefin resins. As an insulating and flame-retarding fiber, for example, a glass fiber or an aromatic polyamide (hereinbelow, properly referred to as an aramid) fiber can be used. A terminology "fibrous" denotes a shape in which an aspect ratio of a cross sectional surface is close to 1, a width of vertical sectional surface is almost uniform, and a length is sufficiently longer than the width. The foregoing polyolefin resin is generally used as a separator and in the case of mixing and using the polyolefin resin, if can be mixed at an arbitrary mixture ratio.

By using the separator 23 of a single layer made of the resin material containing at least one kind of flame-retarding fiber as mentioned above, an oxidation resistance of the separator 23 is improved and a deterioration of the cycle characteristics caused by the oxidation of the separator 23 can be suppressed. As for the cycle characteristics of the separator 23, it is considered that the characteristics deterioration is suppressed owing to the improvement of the oxidation resistance and the improvement of the air permeability of the separator 23 that is realized by allowing the flame-retarding fiber to be contained.

By dispersing the flame-retarding fiber in the resin material, even if the resin material intends to contract at the time of an increase in temperature of the secondary battery, the flame-retarding fiber does not follow it and the contraction of the separator 23 can be suppressed, so that the thermal stability is improved. Consequently, a short-circuit in the battery that is caused by the contraction of the separator 23 and a thermo-runaway of the secondary battery that is caused by the short-circuit are prevented and the safety can be improved.

In the case of a material which does not have a fibrous shape although it is a flame retarding substance, it follows the contraction of the polyolefin resin and it is difficult to obtain an adequate effect of suppressing the contraction of the separator 23. In the present application, it is indispensable to disperse the flame retarding substance having the fibrous shape in the polyolefin resin material.

In a manner similar to the related art, such a separator 23 also has what is called a shutdown mechanism in which the polyolefin resin of the separator 23 is fused at the time of the increase in temperature in the battery and the fused resin chokes a number of holes formed in the separator 23, thereby suppressing reactions of the cathode 21 and anode 22. Therefore, the high safety can be obtained owing to the effects of both of the shutdown mechanism aid the suppression of the deterioration and contraction of the separator 23.

It is preferable that a content of the glass fiber in the separator 23 lies within a range from 0.5 wt % or more to 30 wt % or less. This is because if the content is small, the separator 23 contracts aid if the content is large, an amount of glass fiber is too large, binding performance of the resins deteriorates, and it is difficult to mold the separator into a sheet shape. It is much preferable that the glass fiber of a larger amount within the foregoing range is contained because the better cycle characteristics are obtained and the contraction suppressing effect of the separator 23 is high.

It is preferable that a content of the aramid fiber in the separator 23 lies within a range from 0.5 wt % or more to 50 wt % or less. This is because if the content is small, the separator 23 contracts and if the content is large, an amount of aramid fiber is too large, binding performance of the resins deteriorates, and it is difficult to mold the separator into a sheet shape. In a manner similar to the case of the glass fiber, it is much preferable that the aramid fiber of a larger amount within the foregoing range is contained because the better cycle characteristics are obtained and the contraction suppressing effect of the separator 23 is high.

It is preferable that a thickness of the separator 23 lies within a range from 5 µm or more to 25 µm or less. This is because if the separator is thin, there is a case of occurrence of a short-circuit and if it is thick, ion permeability deteriorates and volume efficiency of the battery deteriorates. The thickness was measured by using a Digital Gauge DG110B made by Sony Manufacturing Systems Co., Ltd.

It is preferable that air permeability of the separator 23 lies within a range from 100 sec/100 cc or more to 600 sec/100 cc or less as a value converted into die thickness of 20 µm. This is because if the air permeability is small, there is a case of occurrence of a short-circuit and if the air permeability is large, an ion conductivity decreases. The air permeability was measured by using a Gurley type densometer G-B2C made by Toyo Seiki Co., Ltd.

It is preferable that porosity of the separator 23 lies within a range from 25% or more to 65% or less. This is because if the porosity is small, the ion conductivity decreases and if the porosity is large, there is a case of occurrence of the short-circuit. The porosity was measured by using a mercury porosimeter Pore Master 33P made by YUASA-IONICS Co., Ltd.

It is preferable that a piercing strength of the separator 23 lies within a range from 100 gf or more to 1000 gf or less when it is converted into a value of the thickness of 20 µm. This is because if the piercing strength is small, there is a case of occurrence of the short-circuit and if the piercing strength is large, the ion conductivity decreases. The piercing strength was measured by using a Handy-Type Compression Tester KES-G5 made by KATO TECH Co, Ltd.

A non-aqueous electrolytic solution as a liquid electrolyte has been impregnated into the separator 23. The electrolytic solution will be described hereinbelow.

[Non-Aqueous Electrolytic Solution]

Electrolytic salt and an organic solvent which are generally used in the secondary battery can be used for the non-aqueous electrolytic solution.

As a solvent, a cyclic carbonic ester such as ethylene carbonate EC, propylene carbonate PC, or the like can be used. It is preferable that either ethylene carbonate EC or propylene carbonate PC is used or it is particularly preferable that both of them are mixed and used. This is because the cycle characteristics can be improved.

As a solvent, in addition to those cyclic esters, dimethyl carbonate DMC, diethyl carbonate DEC, ethylmethyl carbonate EMC, dipropyl carbonate DPC, ethylpropyl carbonate EPC, or their chain-like carbonic ester class can be used.

Further, it is preferable that 2,4-difluoroanisole or vinylene carbonate is contained as a solvent. This is because according to 2,4-difluoroanisole, a discharge capacitance can be improved and, according to vinylene carbonate, the cycle characteristics can be improved. Therefore, if they are mixed and used, since the discharge capacitance and the cycle characteristics can be improved, it is preferable.

Besides them, as a solvent, there can be mentioned: butylene carbonate; γ-butyrolactone; γ-valerolactone; 1,2-dimethoxy ethane; tetrahydrofuran; 2-methyl tetrahydrofuran; 1,3-dioxorane; 4-methyl-1,3-dioxorane; methyl acetate; methyl propionate; acetonitrile; glutaronitrile; adiponitrile; methoxy acetonitrile; 3-methoxy propylonitrile; N,N-dimethyl formamide; N-methyl pyrrolidinone; N-methyl oxazolidinone; N,N-dimethyl imidazolidinone; nitromethane; nitromethane; sulfolan; dimethyl sulfoxide; trimethyl phosphate; or the like.

There is also a case where a compound obtained by substituting halogen for hydrogen as at least a part of those non-aqueous solvents is preferable because there is a case where reversibility of an electrode reaction can be improved in dependence on the kind of electrode which is combined.

As electrolytic salt; for example, lithium salt can be mentioned. One kind of lithium salt can be solely used or two or more kinds of lithium salt may be mixed and used. As lithium salt, there can be mentioned; $LiPF_6$; $LiBF_4$; $LiAsF_6$; $LiClO_4$; $LiB(C_6H_5)_4$; $LiCH_3SO_3$; $LiCF_3SO_3$; $LiN(SO_2CF_3)$; $LiC(SO_2CF_3)_3$; $LiAlCl_4$; $LiSiF_6$; $LiCl$; lithium difluoro[oxalato-O,O']borate; lithium bis[oxalato-O,O']borate; LiBr; or the like. Among them, $LiPF_6$ is preferable because the high ion conductivity can be obtained and the cycle characteristics can be improved.

[Manufacturing of Secondary Battery]

For example, the secondary battery can be manufactured as follows.

First, for example, the cathode active material, conductive material, and binder are mixed and a cathode mixture is adjusted. This cathode mixture is dispersed in the solvent such as N-methyl-2-pyrrolidone NMP or the like, thereby forming a paste-like cathode mixture slurry. Subsequently, the cathode collector 21A is coated with the cathode mixture slurry, the solvent is dried, and thereafter, the obtained collector is compression-molded by a roll pressing machine or the like, thereby forming the cathode active material layers 21B and forming the cathode 21.

For example, the anode active material and binder are mixed and an anode mixture is adjusted. This anode mixture is dispersed in the solvent such as N-methyl-2-pyrrolidone or the like, thereby forming a paste-like anode mixture shiny. Subsequently, the anode collector 22A is coated with the anode mixture slurry, the solvent is dried, and thereafter, the obtained collector is compression-molded by the roll pressing machine or the like, thereby forming the anode active material layers 22B and forming the anode 22.

Subsequently, the cathode lead 25 is attached to the cathode collector 21A by welding or the like and the anode lead 26 is attached to the anode collector 22A by welding or the like. Thereafter, the cathode 21 and the anode 22 are wound through the separator 23, a front end portion of the cathode lead 25 is welded to the relief valve mechanism 15, a front end portion of the anode lead 26 is welded to the battery can 11, and the wound cathode 21 and anode 22 are sandwiched by the pair of insulating plates 12 and 13 and enclosed in the battery can 11. After the cathode 21 and the anode 22 were enclosed in the battery can 11, the electrolytic solution is injected into the battery can 11 and impregnated into the separator 23. Thereafter, the battery cap 14, relief valve mechanism 15, and PTC element 16 are caulked through the gasket 17 and fixed to the open end portion of the battery can 11. Thus, the secondary battery shown in FIG. 1 is obtained.

In the secondary battery according to the first embodiment the open circuit voltage in the perfect charging state lies within the range, preferably, from 4.25V or more to 6.00V or less, much preferably, from 4.35V or more to 4.55V or less. This is because if the open circuit voltage is set to 4.25V or more, using efficiency of the cathode active material can be increased and the high energy density can be obtained and if it is set to 4.55V or less, the deterioration in battery characteristics such as cycle characteristics, floating characteristics, or the like can be suppressed.

In the secondary battery according to the first embodiment, when the charge is performed, lithium ions are dedoped from the cathode active material layer 21B. The lithium ions are doped into the anode material which can dope and dedope lithium contained in the anode active material layer 22B through the electrolytic solution. Subsequently, when the discharge is performed, the lithium ions doped in the anode material which can dope and dedope lithium contained in the anode active material layer 22B are dedoped and then doped into the cathode active material layer 21B through the electrolytic solution. Since the separator 23 has the construction mentioned above, the chemical stability is improved. Even if the open circuit voltage upon perfect charging is set to a high voltage, the occurrence of the micro short-circuit is suppressed and the battery characteristics are improved.

In the secondary battery according to the first embodiment, since the open circuit voltage upon perfect charging lies within the range from 4.25V or more to 6.00V or less, the high energy density can be obtained. As for the separator 23, by dispersing at least either the aramid fiber or the glass fiber in the resin made of polyethylene PE, polypropylene PP, or the mixture of polyethylene PE and polypropylene PP, the oxidation resistance and the thermal stability of the separator 23 can be improved and the occurrence of the micro short-circuit can be suppressed.

(Second Embodiment)

A secondary battery according to the second embodiment is what is called a lithium metal secondary battery in which a capacitance of the anode is expressed by a capacitance component that is caused by a precipitation and dissolution of lithium as an electrode reactive substance.

This secondary battery has a construction and an effect similar to those of the secondary battery according to the first embodiment except that a construction of the anode active material layers 22B differs from that of the first embodiment. Therefore, corresponding component elements are designated by the same reference numerals and an will be described with reference to FIGS. 1 and 2 and an explanation of the same portions is omitted here.

The anode active material layers 22B are made of a lithium metal as an anode active material and the high energy density can be obtained. Although the anode active material layers 22B can be constructed so that they have already existed at the time of an assembling process, it can be also constructed in such a manner that they do not exist upon assembling but they are made of the lithium metal precipitated upon charging. The anode active material layers 22B can be also used as collectors and the anode collector 22A may be deleted.

This secondary battery can be manufactured in a manner similar to the secondary battery according to the first embodiment except that the anode 22 is made by only the anode collector 22A or only the lithium metal or by the anode active material layers 22B formed by adhering the lithium metal to the anode collector 22A.

In this secondary battery, when a charge is executed, for example, lithium ions are dedoped from the cathode 21 and precipitated as a lithium metal onto the surface of the anode collector 22A through the electrolyte and the anode active material layers 22B are formed as shown in FIG. 2. When a discharge is executed, for example, the lithium metal is eluted as lithium ions from the anode active material layers 22B and doped into the cathode 21 through the electrolyte. Since the separator 23 has the foregoing construction, the oxidation resistance and the thermal stability are improved.

(Third Embodiment)

In a secondary battery according to the third embodiment, a capacitance of the anode contains a capacitance component that is caused by the dope and dedope of lithium as an electrode reactive substance and a capacitance component that is caused by a precipitation and dissolution of lithium and is expressed by the sum of those capacitance components.

This secondary battery has a construction and an effect similar to those of the secondary battery according to the first or second embodiment except that a construction of the anode active material layers differs from that of the first or second embodiment, and can be similarly manufactured. Therefore, this secondary battery will be described by using the same reference numerals with reference to FIGS. 1 and 2. A detailed explanation of the same component elements is omitted here.

According to the anode active material layers 22B, for example, a charge capacitance of the anode material which can dope and dedope lithium is set to be smaller than a charge capacitance of the cathode 21, thereby allowing the precipitation of the lithium metal into the anode 22 to be started at a point of time when the open circuit voltage (that is, battery voltage) is lower than the overcharge voltage in the charging step. Therefore, in this secondary battery, both of the anode material which can dope and dedope lithium and the lithium metal function as anode active substances, and the anode material which can dope and dedope lithium is a base material which is used when the lithium metal is precipitated.

The overcharge voltage denotes an open circuit voltage when the battery enters an overcharging state and indicates a voltage higher than the open circuit voltage of the "perfectly charged" battery which has been disclosed and defined in, for example, "Evaluation reference guideline about safety of lithium secondary battery" (SBA G1101) as one of the guidelines defined by Japan Storage Battery Association (abbreviated to SBA: Battery Association of Japan abbreviated to BAJ). In other words, the overcharge voltage indicates a voltage higher than the open circuit voltage obtained after the battery was charged by using a charging method, a standard charging method, or a recommended charging method used when a nominal capacitance of each battery is obtained.

This secondary battery is similar to the lithium ion secondary battery in the related art in terms of a point that the anode material which can dope and dedope lithium is used for the anode 22. This secondary battery is also similar to the lithium metal secondary battery in the related art in terms of a point that the lithium metal is precipitated into the anode 22. However, since the lithium metal is precipitated into the anode material which can dope and dedope lithium, the high energy density can be obtained and the cycle characteristics and the rapid charging characteristics can be improved.

In this secondary battery, when a charge is executed, lithium ions are dedoped from the cathode 21. First, they are doped into the mode material which can dope and dedope lithium contained in the anode 22 through the electrolytic solution. When the charge is further continued, the lithium metal is started to be precipitated onto the surface of the anode material which can dope and dedope lithium in a state where the open circuit voltage is lower than the overcharge voltage. After that, the lithium metal continues to be precipitated to the anode 22 until the charge is finished. Subsequently, when a discharge is executed, first, the lithium metal precipitated to the anode 22 is eluted as ions and doped into the cathode 21 through the electrolytic solution. When the discharge is further continued, the lithium ions doped into the anode material which can dope and dedope lithium in the anode 22 are dedoped and then doped into the cathode 21 through the electrolytic solution. Since the separator 23 has the foregoing construction, the oxidation resistance and the thermal stability are improved.

(Fourth Embodiment)

Figure 3:
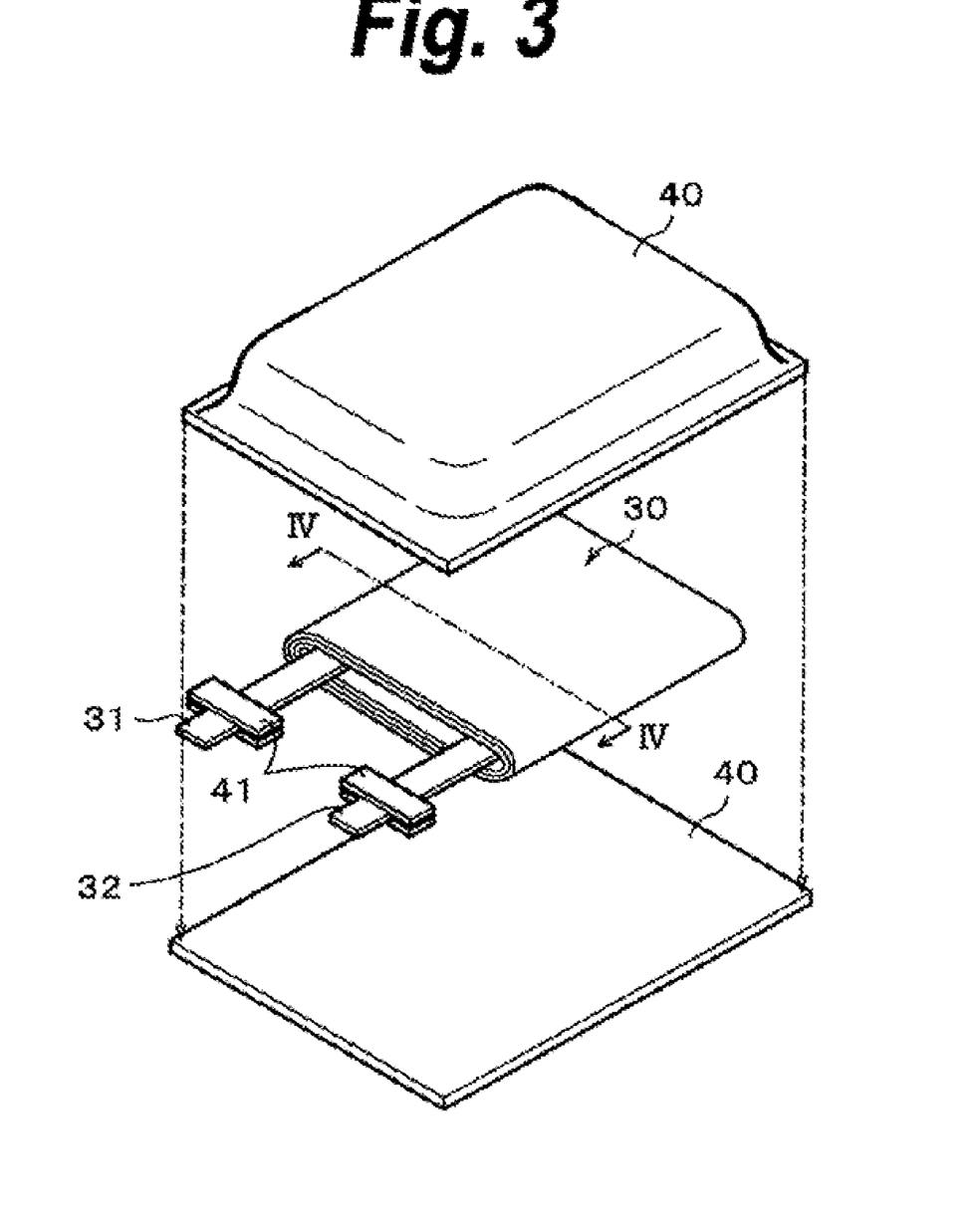
FIG. 3 is an exploded perspective view showing a constructional example of a secondary battery according to a fourth embodiment.

FIG. 3 is an exploded perspective view showing a constructional example of a secondary battery according to the fourth embodiment. According to this secondary battery, a winded electrode member 30 to which a cathode lead 31 and an anode lead 32 have been attached is enclosed in a film-like sheathing member 40. A miniaturization, a light weight, and a thin shape of the secondary battery can be realized.

The cathode lead 31 and the anode lead 32 are led out, for example, in the same direction from the inside to the outside of the sheathing member 40, respectively. Each of the cathode lead 31 and the anode lead 32 is made of a metal material such as aluminum Al, copper Cu, nickel Ni, stainless steel, or the like and has a thin-plate shape or a mesh shape.

The sheathing member 40 is made of a rectangular aluminum laminate film obtained by adhering, for example, a nylon film, aluminum foil, and a polyethylene film in this order. The sheathing member 40 is arranged so that, for example, the polyethylene film side and the winded electrode member 30 face each other and outer edge portions are mutually fused or adhered by an adhesive. Adhesive films 41 to prevent an invasion of the outside air have been inserted between the sheathing member 40 and the cathode lead 31 and between the sheathing member 40 and the anode lead 32. The adhesive film 41 is made of a material having adhesion to the cathode lead 31 and the anode lead 32, for example, it is made of a polyolefin resin such as polyethylene, polypropylene, denatured polyethylene, denatured polypropylene, or the like. The sheathing member 40 may be made of a laminate film having another structure, a high molecular film such as polypropylene or the like, or a metal film in place of the foregoing aluminum laminate film.

Figure 4:
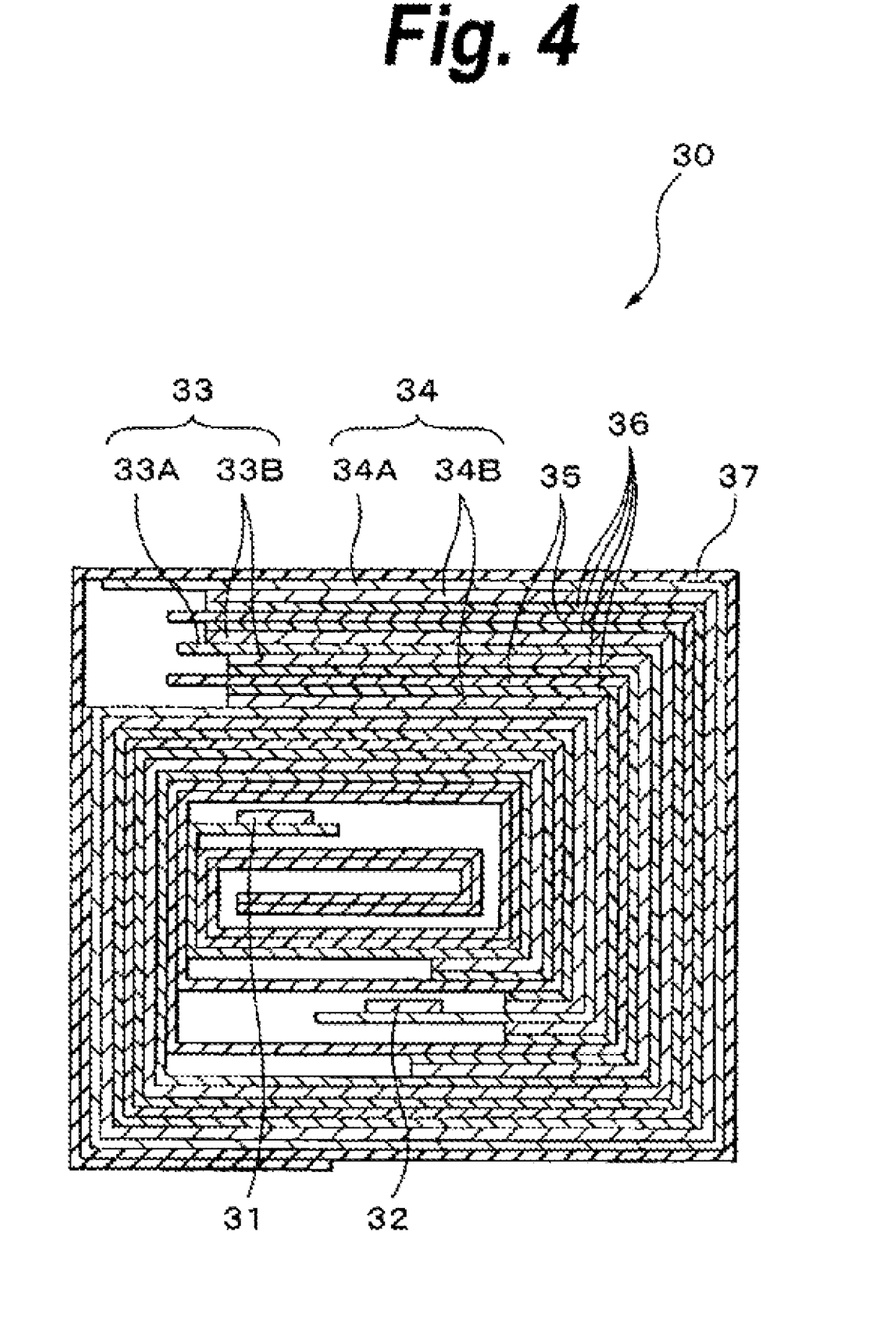
FIG. 4 is a cross sectional view taken along the line IV-IV of a winded electrode member shown in FIG. 3.

FIG. 4 is a cross sectional view taken along the line IV-IV of the winded electrode member 30 shown in FIG. 3. The winded electrode member 30 is constructed in such a manner that a cathode 33 and an anode 34 are laminated through a separator 35 and an electrolyte layer 36 and wound and the outermost peripheral portion is protected by a protecting tape 37. The cathode 33 has a structure in which a cathode active material layer 33B or cathode active material layers 33B is/are provided for one surface or both surfaces of a cathode collector 33A. The anode 34 has a structure in which an anode active material layer 34B or anode active material layers 34B is/are provided for one surface or both surfaces of an anode collector 34A. The cathode 33 and the anode 34 are arranged so that the anode active material layer 34B side faces the cathode active material layer 33B. Constructions of the cathode collector 33A, cathode active material layer 33B, anode collector 34A, anode active material layer 34B, and separator 35 are similar to those of the cathode collector 21A, cathode active material layer 21B, anode collector 22A, anode active material layer 22B, and separator 23 described in the first to third embodiments.

The electrolyte layer 36 includes an electrolytic solution and a high molecular compound serving as a holder to hold the electrolytic solution and is in what is called a gel-state. The gel electrolyte layer 36 is preferable because the high ion conductivity can be obtained and a leakage of the solution of the battery can be prevented. A construction of the electrolytic solution (that is, solvent, electrolytic salt, and the like) is similar to that of each of the secondary batteries of the first to third embodiments. As a high molecular compound, for example, there can be mentioned; polyacrylonitrile: polyvinylidene fluoride; copolymer of vinylidene fluoride and hexafluoro propylene; polytetrafluoro ethylene; polyhexafluoro propylene; polyethylene oxide: polypropylene oxide; polyphosphazene; polysiloxane; polyvinyl acetate;

polyvinyl alcohol; polymethyl methacrylate; polyacrylic acid; polymethacrylate; styrene-butadiene rubber; nitrile-butadiene rubber; polystyrene; or polycarbonate. Particularly, from a viewpoint of electrochemical stability, polyacrylonitrile, polyvinylidene fluoride, polyhexafluoro propylene, or polyethylene oxide is preferable.

For example, the secondary battery can be manufactured as follows.

First, each of the cathode 33 and the anode 34 is coated with a presolution containing a solvent, electrolytic salt, a high molecular compound, and a mixed solvent, and the mixed solvent is volatilized, thereby forming the electrolyte layer 36. After that, the cathode lead 31 is attached to an end portion of the cathode collector 33A by welding. The anode lead 32 is also attached to an end portion of the anode collector 34A by welding. Subsequently, the cathode 33 and anode 34 on each of which the electrolyte layer 36 has been formed are laminated through the separator 35, thereby forming a laminate. After that, this laminate is wound in its longitudinal direction and the protecting tape 37 is adhered to the outermost peripheral portion, thereby forming the winded electrode member 30. Finally, for example, the winded electrode member 30 is sandwiched between the sheathing members 40, the outer edge portions of the sheathing members 40 are adhered by thermal melt-bonding or the like, thereby sealing. In this instance, the adhesive films 41 are inserted between the cathode lead 31 and the sheathing member 40 and between the anode lead 32 and the sheathing member 40. Thus, the secondary battery shown in FIGS. 3 and 4 are obtained.

The secondary battery can be also manufactured as follows. First, the cathode 33 and the anode 34 are manufactured as mentioned above and the cathode lead 31 and the anode lead 32 are attached to the cathode 33 and the anode 34, respectively. After that, the cathode 33 and the anode 34 are laminated through the separator 35 and wound and the protecting tape 37 is adhered to the outermost peripheral portion, thereby forming a winded member as a precursor of the winded electrode member 30. Subsequently, the winded member is sandwiched by the sheathing member 40, the outer peripheral edge portions except for one side are thermally melt-bonded in a sack shape, and the winded member is enclosed in the sheathing member 40. Subsequently, a composition (for the electrolyte) containing the solvent, electrolytic salt, a monomer as a raw material of the high molecular compound, a polymerization initiator, and another material such as a polymerization inhibitor as necessary is prepared and injected into the sheathing member 40.

After a composition for the electrolyte was injected, an opening portion of the sheathing member 40 is thermally melt-bonded under a vacuum atmosphere and sealed. Subsequently, the monomer is polymerized by applying a heat so as to obtain the high molecular compound, thereby forming the gel electrolyte layer 36. The secondary battery shown in FIG. 3 is assembled.

A function and an effect of this secondary battery are similar to those of the secondary batteries according to the first to third embodiments.

The secondary batteries according to the first to fourth embodiments are designed in such a manner that the open circuit voltage upon perfect charging (that is, battery voltage) lies within a range, for example, from 4.25V or more to 6.00V or less, preferably, from 4.35V or more to 4.55V or less. By using the separator as mentioned above under the oxidation atmosphere at the time of such a high charge voltage, the oxidation decomposition of the separator is suppressed and the secondary battery having the high safety can be obtained. Since the separator as mentioned above has the high safety not only in the secondary battery having the high charge voltage over 4.2V but also in the secondary battery whose charge voltage is equal to 4.2V or less, it can be also used for the secondary battery of 4.2V or less.

EXAMPLES

Although the present application is described hereinbelow by Examples, the present application is not limited only to those Examples.

(Samples 1-1 to 1-11)

A battery in which a capacitance of an anode is expressed by a capacitor component that is caused by the dope and dedope of lithium, that is, a lithium ion secondary battery is manufactured. In this instance, it is assumed that the battery is as shown in FIG. 1.

[Manufacturing of Cathode]

First, a cathode active material is manufactured. Commercially available nickel nitrate, cobalt nitrate, and manganese nitrate are mixed as an aqueous solution so that a mole ratio of Ni, Co, and Mn is equal to (0.50:0.20:0.30). After that, while sufficiently stirring the aqueous solution, aqueous ammonia is dropped into the mixed solution, thereby obtaining a composite hydroxide. The composite hydroxide and lithium hydroxide are mixed, baked at 900° C. for 10 hours by using an electric furnace, and thereafter, ground, thereby obtaining a lithium composite oxide powder as a cathode active material. With respect to the obtained lithium composite oxide powder, an analysis is made by an ASS (Atomic Absorption Spectrometry), so that compositions of $LiNi_{0.50}Co_{0.20}Mn_{0.30}O_2$ have been confirmed. A particle diameter is measured by a laser diffracting method, so that a mean diameter is equal to 13 μm. An X-ray diffraction measurement is further made, so that it has been confirmed that they are analogous to a pattern of $LiNiO_2$ disclosed in 09-0063 of an ICDD (International Center for Diffraction Data) card and a stratified rocksalt structure similar to that of $LiNiO_2$ is formed. An observation is furthermore made by an SEM (Scanning Electron Microscope), so that a spherical particle formed by aggregating primary particles of diameters of 0.1 μm to 5 μm has been observed.

The obtained $LiNi_{0.50}Co_{0.20}Mn_{0.30}O_2$ powder, graphite serving as a conductive material, and polyvinylidene fluoride serving as a binder are mixed at a mass ratio of ($LiNi_{0.50}Co_{0.20}Mn_{0.30}O_2$ powder:graphite:polyvinylidene fluoride)=(86:10:4) and the cathode mixture is adjusted. Subsequently, by dispersing the cathode mixture in N-methyl-2-pyrrolidone serving as a solvent, the cathode mixture slurry is obtained. Both surfaces of the cathode collector made of belt-shaped aluminum foil having a thickness of 20 μm are uniformly coated with the cathode mixture slurry, the solvent is dried, and the obtained collector is compression-molded by the roll pressing machine, thereby forming the cathode active material layers and forming the cathode. A thickness of cathode is set to 150 μm. After that, the cathode lead made of aluminum is attached to one end of the cathode collector.

[Manufacturing of Anode]

A spherical graphite powder having a mean diameter of 30 μm and serving as an anode active material and polyvinylidene fluoride serving as a binder are mixed at a mass ratio of (spherical graphite powder:polyvinylidene fluoride)=(90:10) and the anode mixture is adjusted. Subsequently, by dispersing the anode mixture in N-methyl-2-pyrrolidone serving as a solvent, the anode mixture slurry is obtained. Both surfaces of the anode collector made of belt-shaped copper foil having a thickness of 15 μm are uniformly coated with the anode mixture slurry and the obtained collector is heat-pressure molded, thereby forming the anode active material layers and forming the anode. A thickness of anode is set to 160 μm. After that, the anode lead made of nickel is attached to one end of the anode collector. An electrochemical equivalent ratio of the cathode and the anode is designed so that the capacitance of the anode is expressed by a capacitance component that is caused by the dope and dedope of lithium.

After the cathode and the anode were manufactured, respectively, a separator made by a microporous membrane is prepared. The anode, separator, cathode, and separator are laminated in this order. An obtained laminate is spirally wound a number of times, thereby manufacturing a jerry roll type winded electrode member. As a separator, a separator made of a material shown in Table 1 is used. That is, in Sample 1-1, the separator made of only polyethylene is used. In Samples 1-2 to 1-6, the separators formed by dispersing a glass fiber in polyethylene so that a content of glass fiber is equal to 0.5 wt %, 10 wt %, 20 wt %, 30 wt %, and 40 wt % are used. In Samples 1-7 to 1-11, the separators formed by dispersing aramid fiber in polyethylene so that a content of aramid fiber is equal to 0.5 wt %, 10 wt %, 30 wt %, 50 wt %, and 60 wt % are used. Thicknesses of all of the separators are set to 20 μm.

The separators made of polyethylene and the glass fiber or the aramid fiber are manufactured as follows. First, polyethylene, the glass fiber or the aramid fiber, a plasticizer, and an antioxidant are melt-kneaded. Subsequently, an obtained melt-kneaded substance is molded by a pressing machine and cooled. An obtained gel sheet is simultaneously biaxial-oriented, thereby manufacturing a thin film. After that, the plasticizer is extracted. As a plasticizer extracting solvent, a solvent which is a poor solvent for polyethylene and is a good solvent for the plasticizer is preferable. For example, the following organic solvent can be mentioned, a hydrocarbon class such as n-hexane, cyclohexane, or the like; an alcohol class such as methanol, ethanol, isopropanol, or the like; a ketone class such as acetone, methylethyl ketone, or the like; an ether class such as tetrahydro furan or the like; a halogenated hydrocarbon class such as methylene chloride, 1,1,1-trichloroethane, or the like; or the like. Further, it is preferable to execute a heat-fixing process in order to reduce the contraction. This is because the contraction of the film in a high temperature atmosphere can be reduced by executing the heat-fixing process. A surface process such as electron beam irradiation, plasma irradiation, coating of a surface active agent, chemical reforming, or the like may be executed as necessary.

After the winded electrode member was manufactured, the winded electrode member is sandwiched between a pair of insulating plates. The anode lead is welded to the battery can. The cathode lead is welded to the relief valve mechanism. The winded electrode member is enclosed in the battery can made of nickel-plated iron. After that, an electrolytic solution of 4.0 g is injected into the battery can by a pressure reducing system. As an electrolytic solution, an electrolytic solution obtained by dissolving a mixed substance, as an electrolytic salt, of $LiPF_6$ and LiTFSI (lithium bis(trifluoromethanesulfonyl)imide) into the following solvent at a ratio of 1.0 mol/kg is used; that is, the solvent obtained by mixing ethylene carbonate EC, dimethyl carbonate DMC, and vinylene carbonate VC at a mass ratio of (ethylene carbonate EC:dimethyl carbonate DMC:vinylene carbonate VC=35:60:1). A ratio of ($LiPF_6$:LiTFSI=90 mol %:10 mol %).

After the electrolytic solution was injected into the battery can, a battery cap is caulked to the battery can through a gasket whose surface has been coated with asphalt, thereby obtaining cylindrical lithium ion secondary batteries each having a diameter of 14 mm and a height of 65 mm of Samples 1-1 to 1-11.

<40° C. Cycle Characteristics>

To each of the cylindrical lithium ion secondary batteries obtained as mentioned above, a constant current and constant voltage charge is performed at 4.20V and 1000 mA in a high temperature tank of 40° C. Subsequently, a constant current discharge is performed by a constant current of 2000 mA until the battery voltage reaches 3.00V. By repeating such charge and discharge, a discharge capacitance maintaining ratio at the 300th cycle to a discharge capacitance at the first cycle is obtained as {(discharge capacitance at the 300th cycle/discharge capacitance at the first cycle)×100%}. Its result is shown in Table 1.

<60° C. External Short-Circuit>

To each of the cylindrical lithium ion secondary batteries obtained as mentioned above, the constant current and constant voltage charge is performed at 4.20V and 1000 mA. After that, an external short-circuit test is executed in the high temperature tank set to 60° C. and a battery temperature is measured. By this test, if the battery temperature exceeds 120° C., the PTC element is certainly necessary. However, when the battery temperature is equal to 120° C. or lower, a disconnection due to a shut-down of the separator can be performed and the PTC element is unnecessary. Therefore, it can be regarded that a battery in which the battery temperature does not exceed 120° C. and even if the PTC element is not provided, the disconnection can be made by the shut-down of the separator has a more excellent safety. Its result is shown in Table 1. In Table 1, in the test, the batteries in each of which the temperature is equal to 120° C. or lower are shown by "O" and the batteries in each of which the temperature exceeds 120° C. are shown by "×". This means that the batteries shown by "×" are not defective but it is necessary to arrange the PTC element.

(Samples 2-1 to 2-11)

Cylindrical lithium ion secondary batteries are obtained in substantially the same manner as those of Samples 1-1 to 1-11 mentioned above. Subsequently, 40° C. cycle characteristics and a 60° C. external short-circuit of each of the cylindrical lithium ion secondary batteries obtained as mentioned above are evaluated as follows.

<40° C. Cycle Characteristic>

The 40° C. cycle characteristics are evaluated in substantially the same manner as those of Samples 1-1 to 1-11 mentioned above except that the battery voltage is set to 4.25V. Its result is shown in Table 2.

<60° C. External Short-Circuit>

The 60° C. external short-circuit is evaluated in substantially the same manner as those of Samples 1-1 to 1-11 except that the battery voltage is set to 4.25V. Its result is shown in Table 2.

(Samples 3-1 to 3-11)

Cylindrical lithium ion secondary batteries are obtained in substantially the same manner as those of Samples 1-1 to 1-11 mentioned above. Subsequently, 40° C. cycle characteristics and a 60° C. external short-circuit of each of the cylindrical lithium ion secondary batteries obtained as mentioned above are evaluated as follows.

<40° C. Cycle Characteristics>

The 40° C. cycle characteristics are evaluated in substantially the same manner as those of Samples 1-1 to 1-11 mentioned above except that the battery voltage is set to 4.30V. Its result is shown in Table 3.

<60° C. External Short-Circuit>

The 60° C. external short-circuit is evaluated in substantially the same manner as those of Samples 1-1 to 1-11 except that the battery voltage is set to 4.30V. Its result is shown in Table 3.

(Samples 4-1 to 4-11)

Cylindrical lithium ion secondary batteries are obtained in substantially the same manner as those of Samples 1-1 to 1-11 mentioned above. Subsequently, 40° C. cycle characteristics and a 60° C. external short-circuit of each of the cylindrical lithium ion secondary batteries obtained as mentioned above are evaluated as follows.

<40° C. Cycle Characteristics>

The 40° C. cycle characteristics are evaluated in substantially the same manner as those of Samples 1-1 to 1-11 mentioned above except that the battery voltage is set to 4.35V. Its result is shown in Table 4.

<60° C. External Short-Circuit>

The 60° C. external short-circuit is evaluated in substantially the same manner as those of Samples 1-1 to 1-11 except that the battery voltage is set to 4.35V. Its result is shown in Table 4.

(Samples 5-1 to 5-11)

Cylindrical lithium ion secondary batteries are obtained in substantially the same manner as those of Samples 1-1 to 1-11 mentioned above. Subsequently, 40° C. cycle characteristics and a 60° C. external short-circuit of each of the cylindrical lithium ion secondary batteries obtained as mentioned above are evaluated as follows.

<40° C. Cycle Characteristics>

The 40° C. cycle characteristics are evaluated in substantially the same manner as those of Samples 1-1 to 1-11 mentioned above except that the battery voltage is set to 4.40V. Its result is shown in Table 5.

<60° C. External Short-Circuit>

The 60° C. external short-circuit is evaluated in substantially the same manner as those of Samples 1-1 to 1-11 except that the battery voltage is set to 4.40V. Its result is shown in Table 5.

(Samples 6-1 to 6-11)

Cylindrical lithium ion secondary batteries are obtained in substantially the same manner as those of Samples 1-1 to 1-11 mentioned above. Subsequently, 40° C. cycle characteristics and a 60° C. external short-circuit of each of the cylindrical lithium ion secondary batteries obtained as mentioned above are evaluated as follows.

<40° C. Cycle Characteristics>

The 40° C. cycle characteristics are evaluated in substantially the same manner as those of Samples 1-1 to 1-11 mentioned above except that the battery voltage is set to 4.50V. Its result is shown in Table 6.

<60° C. External Short-Circuit>

The 60° C. external short-circuit is evaluated in substantially the same manner as those of Samples 1-1 to 1-11 except that the battery voltage is set to 4.50V. Its result is shown in Table 6.

(Samples 7-1 to 7-11)

Cylindrical lithium ion secondary batteries are obtained in substantially the same manner as those of Samples 1-1 to 1-11 mentioned above. Subsequently, 40° C. cycle characteristics and a 60° C. external short-circuit of each of the cylindrical lithium ion secondary batteries obtained as mentioned above are evaluated as follows.

<40° C. Cycle Characteristics>

The 40° C. cycle characteristics are evaluated in substantially the same manner as those of Samples 1-1 to 1-11 mentioned above except that the battery voltage is set to 4.55V. Its result is shown in Table 7.

<60° C. External Short-Circuit>

The 60° C. external short-circuit is evaluated in substantially the same manner as those of Samples 1-1 to 1-11 except that the battery voltage is set to 4.55V. Its result is shown in Table 7.

TABLE 1

[CHARGE VOLTAGE 4.20 V]

| | RESIN BASE | FLAME-RETARDING FIBER | | SEPARATOR PHYSICAL PROPERTIES | | 60° C. | DISCHARGE |
|---|---|---|---|---|---|---|---|
| | MATERIAL PE [wt %] | GLASS FIBER [wt %] | ARAMID FIBER [wt %] | PIERCING STRENGTH [gf] | AIR PERMEABILITY [sec/100 cc] | EXTERNAL SHORT-CIRCUIT | CAPACITANCE MAINTAINING RATIO [%] |
| SAMPLE 1-1 | 100 | 0 | 0 | 450 | 400 | ○ | 91 |
| SAMPLE 1-2 | 95.5 | 0.5 | 0 | 380 | 860 | ○ | 91 |
| SAMPLE 1-3 | 90 | 10 | 0 | 250 | 300 | ○ | 93 |
| SAMPLE 1-4 | 80 | 20 | 0 | 200 | 250 | ○ | 93 |
| SAMPLE 1-5 | 70 | 30 | 0 | 150 | 220 | ○ | 93 |
| SAMPLE 1-6 | 60 | 40 | 0 | — | — | — | — |
| SAMPLE 1-7 | 95.5 | 0 | 0.5 | 330 | 370 | ○ | 92 |
| SAMPLE 1-8 | 90 | 0 | 10 | 280 | 300 | ○ | 93 |
| SAMPLE 1-9 | 80 | 0 | 30 | 190 | 230 | ○ | 93 |
| SAMPLE 1-10 | 50 | 0 | 50 | 150 | 160 | ○ | 93 |
| SAMPLE 1-11 | 40 | 0 | 60 | — | — | — | — |

TABLE 2

[CHARGE VOLTAGE 4.25 V]

| | RESIN BASE MATERIAL PE [wt %] | FLAME-RETARDING FIBER | | SEPARATOR PHYSICAL PROPERTIES | | 60° C. EXTERNAL SHORT-CIRCUIT | DISCHARGE CAPACITANCE MAINTAINING RATIO [%] |
|---|---|---|---|---|---|---|---|
| | | GLASS FIBER [wt %] | ARAMID FIBER [wt %] | PIERCING STRENGTH [gf] | AIR PERMEABILITY [sec/100 cc] | | |
| SAMPLE 2-1 | 100 | 0 | 0 | 450 | 400 | ○ | 85 |
| SAMPLE 2-2 | 95.5 | 0.5 | 0 | 380 | 360 | ○ | 91 |
| SAMPLE 2-3 | 90 | 10 | 0 | 250 | 300 | ○ | 93 |
| SAMPLE 2-4 | 80 | 20 | 0 | 200 | 250 | ○ | 93 |
| SAMPLE 2-5 | 70 | 30 | 0 | 150 | 220 | ○ | 93 |
| SAMPLE 2-6 | 60 | 40 | 0 | — | — | — | — |
| SAMPLE 2-7 | 95.5 | 0 | 0.5 | 330 | 370 | ○ | 92 |
| SAMPLE 2-8 | 90 | 0 | 10 | 280 | 300 | ○ | 93 |
| SAMPLE 2-9 | 80 | 0 | 30 | 190 | 230 | ○ | 93 |
| SAMPLE 2-10 | 50 | 0 | 50 | 150 | 160 | ○ | 93 |
| SAMPLE 2-11 | 40 | 0 | 60 | — | — | — | — |

TABLE 3

[CHARGE VOLTAGE 4.30 V]

| | RESIN BASE MATERIAL PE [wt %] | FLAME-RETARDING FIBER | | SEPARATOR PHYSICAL PROPERTIES | | 60° C. EXTERNAL SHORT-CIRCUIT | DISCHARGE CAPACITANCE MAINTAINING RATIO [%] |
|---|---|---|---|---|---|---|---|
| | | GLASS FIBER [wt %] | ARAMID FIBER [wt %] | PIERCING STRENGTH [gf] | AIR PERMEABILITY [sec/100 cc] | | |
| SAMPLE 3-1 | 100 | 0 | 0 | 450 | 400 | ○ | 75 |
| SAMPLE 3-2 | 95.5 | 0.5 | 0 | 380 | 360 | ○ | 80 |
| SAMPLE 3-3 | 90 | 10 | 0 | 250 | 300 | ○ | 93 |
| SAMPLE 3-4 | 80 | 20 | 0 | 200 | 250 | ○ | 93 |
| SAMPLE 3-5 | 70 | 30 | 0 | 150 | 220 | ○ | 93 |
| SAMPLE 3-6 | 60 | 40 | 0 | — | — | — | — |
| SAMPLE 3-7 | 95.5 | 0 | 0.5 | 330 | 370 | ○ | 92 |
| SAMPLE 3-8 | 90 | 0 | 10 | 280 | 300 | ○ | 93 |
| SAMPLE 3-9 | 80 | 0 | 30 | 190 | 230 | ○ | 93 |
| SAMPLE 3-10 | 50 | 0 | 50 | 150 | 160 | ○ | 93 |
| SAMPLE 3-11 | 40 | 0 | 60 | — | — | — | — |

TABLE 4

[CHARGE VOLTAGE 4.35 V]

| | RESIN BASE MATERIAL PE [wt %] | FLAME-RETARDING FIBER | | SEPARATOR PHYSICAL PROPERTIES | | 60° C. EXTERNAL SHORT-CIRCUIT | DISCHARGE CAPACITANCE MAINTAINING RATIO [%] |
|---|---|---|---|---|---|---|---|
| | | GLASS FIBER [wt %] | ARAMID FIBER [wt %] | PIERCING STRENGTH [gf] | AIR PERMEABILITY [sec/100 cc] | | |
| SAMPLE 4-1 | 100 | 0 | 0 | 450 | 400 | X | 73 |
| SAMPLE 4-2 | 95.5 | 0.5 | 0 | 380 | 360 | ○ | 85 |
| SAMPLE 4-3 | 90 | 10 | 0 | 250 | 300 | ○ | 91 |
| SAMPLE 4-4 | 80 | 20 | 0 | 200 | 250 | ○ | 91 |
| SAMPLE 4-5 | 70 | 30 | 0 | 150 | 220 | ○ | 92 |
| SAMPLE 4-6 | 60 | 40 | 0 | — | — | — | — |
| SAMPLE 4-7 | 95.5 | 0 | 0.5 | 330 | 370 | ○ | 90 |
| SAMPLE 4-8 | 90 | 0 | 10 | 280 | 300 | ○ | 90 |
| SAMPLE 4-9 | 80 | 0 | 30 | 190 | 230 | ○ | 91 |
| SAMPLE 4-10 | 50 | 0 | 50 | 150 | 160 | ○ | 91 |
| SAMPLE 4-11 | 40 | 0 | 60 | — | — | — | — |

TABLE 5

[CHARGE VOLTAGE 4.40 V]

| | RESIN BASE MATERIAL PE [wt %] | FLAME-RETARDING FIBER | | SEPARATOR PHYSICAL PROPERTIES | | 60° C. EXTERNAL SHORT-CIRCUIT | DISCHARGE CAPACITANCE MAINTAINING RATIO [%] |
|---|---|---|---|---|---|---|---|
| | | GLASS FIBER [wt %] | ARAMID FIBER [wt %] | PIERCING STRENGTH [gf] | AIR PERMEABILITY [sec/100 cc] | | |
| SAMPLE 5-1 | 100 | 0 | 0 | 450 | 400 | X | 60 |
| SAMPLE 5-2 | 95.5 | 0.5 | 0 | 380 | 360 | ○ | 81 |
| SAMPLE 5-3 | 90 | 10 | 0 | 250 | 300 | ○ | 83 |
| SAMPLE 5-4 | 80 | 20 | 0 | 200 | 250 | ○ | 83 |
| SAMPLE 5-5 | 70 | 30 | 0 | 150 | 220 | ○ | 87 |
| SAMPLE 5-6 | 60 | 40 | 0 | — | — | — | — |
| SAMPLE 5-7 | 95.5 | 0 | 0.5 | 330 | 370 | ○ | 80 |
| SAMPLE 5-8 | 90 | 0 | 10 | 280 | 300 | ○ | 81 |
| SAMPLE 5-9 | 80 | 0 | 30 | 190 | 230 | ○ | 83 |
| SAMPLE 5-10 | 50 | 0 | 50 | 150 | 160 | ○ | 87 |
| SAMPLE 5-11 | 40 | 0 | 60 | — | — | — | — |

TABLE 6

[CHARGE VOLTAGE 4.50 V]

| | RESIN BASE MATERIAL PE [wt %] | FLAME-RETARDING FIBER | | SEPARATOR PHYSICAL PROPERTIES | | 60° C. EXTERNAL SHORT-CIRCUIT | DISCHARGE CAPACITANCE MAINTAINING RATIO [%] |
|---|---|---|---|---|---|---|---|
| | | GLASS FIBER [wt %] | ARAMID FIBER [wt %] | PIERCING STRENGTH [gf] | AIR PERMEABILITY [sec/100 cc] | | |
| SAMPLE 6-1 | 100 | 0 | 0 | 450 | 400 | X | 55 |
| SAMPLE 6-2 | 95.5 | 0.5 | 0 | 380 | 360 | ○ | 80 |
| SAMPLE 6-3 | 90 | 10 | 0 | 250 | 300 | ○ | 83 |
| SAMPLE 6-4 | 80 | 20 | 0 | 200 | 250 | ○ | 83 |
| SAMPLE 6-5 | 70 | 30 | 0 | 150 | 220 | ○ | 86 |
| SAMPLE 6-6 | 60 | 40 | 0 | — | — | — | — |
| SAMPLE 6-7 | 95.5 | 0 | 0.5 | 330 | 370 | ○ | 80 |
| SAMPLE 6-8 | 90 | 0 | 10 | 280 | 300 | ○ | 83 |
| SAMPLE 6-9 | 80 | 0 | 30 | 190 | 230 | ○ | 83 |
| SAMPLE 6-10 | 50 | 0 | 50 | 150 | 160 | ○ | 86 |
| SAMPLE 6-11 | 40 | 0 | 60 | — | — | — | — |

TABLE 7

[CHARGE VOLTAGE 4.55 V]

| | RESIN BASE MATERIAL PE [wt %] | FLAME-RETARDING FIBER | | SEPARATOR PHYSICAL PROPERTIES | | 60° C. EXTERNAL SHORT-CIRCUIT | DISCHARGE CAPACITANCE MAINTAINING RATIO [%] |
|---|---|---|---|---|---|---|---|
| | | GLASS FIBER [wt %] | ARAMID FIBER [wt %] | PIERCING STRENGTH [gf] | AIR PERMEABILITY [sec/100 cc] | | |
| SAMPLE 7-1 | 100 | 0 | 0 | 450 | 400 | X | 40 |
| SAMPLE 7-2 | 95.5 | 0.5 | 0 | 380 | 360 | ○ | 75 |
| SAMPLE 7-3 | 90 | 10 | 0 | 250 | 300 | ○ | 78 |
| SAMPLE 7-4 | 80 | 20 | 0 | 200 | 250 | ○ | 78 |
| SAMPLE 7-5 | 70 | 30 | 0 | 150 | 220 | ○ | 80 |
| SAMPLE 7-6 | 60 | 40 | 0 | — | — | — | — |
| SAMPLE 7-7 | 95.5 | 0 | 0.5 | 330 | 370 | ○ | 74 |
| SAMPLE 7-8 | 90 | 0 | 10 | 280 | 300 | ○ | 77 |
| SAMPLE 7-9 | 80 | 0 | 30 | 190 | 230 | ○ | 79 |
| SAMPLE 7-10 | 50 | 0 | 50 | 150 | 160 | ○ | 82 |
| SAMPLE 7-11 | 40 | 0 | 60 | — | — | — | — |

According to the glass fiber dispersed in polyethylene, when its content is equal to 40 wt % of the whole separator, it is difficult to mold the glass fiber and to evaluate. According to the aramid fiber as well, when its content is equal to 60 wt % of the whole separator, it is difficult to mold the aramid fiber and to evaluate.

The following points will be understood from the evaluation results of Tables 1 to 7.

When the content of the glass fiber is set to a value within a range from 0.5 wt % or more to 30 wt % or less and the content of the aramid fiber is set to a value within a range from 0.5 wt % or more to 50 wt % or less, even if the charge voltage of the battery is set to any of the charge voltages, the discharge capacitance maintaining ratio is equal to 70% or more. When the charge voltage is set to a value within a range from 4.20V or more to 4.50V or less, the discharge capacitance maintaining ratio is equal to 80% or more. In the 60° C. external short-circuit test, the battery temperature is equal to 120° C. or less and the current shut-down can be performed only by the shut-down function, of the separator without needing the PTC element. Therefore, the cylindrical type lithium ion secondary battery in which both of the cycle characteristics and the safety of the battery are satisfied can be obtained.

As shown in Table 1, when the charge voltage is equal to 4.20V, in the case of using the separator containing the glass fiber or the aramid fiber, the battery characteristics which are equal to or better than those in the case of using the separator which does not contain them can be obtained. When the charge voltage is equal to 4.25V or more, in the case of using the separator which does not contain the glass fiber or the aramid fiber as in the related art, the discharge capacitance maintaining ratio decreases. However, if the glass fiber or the aramid fiber is contained in the separator, the excellent battery characteristics can be obtained without causing a decrease in discharge capacitance maintaining ratio.

Particularly, a large effect which is obtained by using the separator according to the present application when the charge voltage of the battery lies within the range from 4.35V or more to 4.55V or less is confirmed. When the charge voltage lies within the range from 4.35V or more to 4.55V or less, in the case of using the separator which does not contain the glass fiber or the aramid fiber, the cycle characteristics deteriorate. In the 60° C. external short-circuit test, the battery temperature exceeds 120° C. and it is indispensable to arrange the PTC element. On the other hand, in the case of the separator containing the glass fiber or the aramid fiber of 0.5 wt %, the battery temperature is equal to 120° C. or lower. It is unnecessary to arrange the PTC element and the cycle characteristics are also improved. The more the glass fiber or the aramid fiber is contained in the separator within the foregoing range, the better result is obtained.

Although the embodiments and Examples of the present application have specifically been described above, the present application is not limited to the foregoing embodiments and Examples. It should be understood by those skilled in the art that various modifications, combinations, sub-combinations and alterations may occur depending on design requirements and other factors insofar as they are within the scope of the appended claims or the equivalents thereof.

For example, the numerical values mentioned in the foregoing embodiments and Examples are nothing but examples and other numerical values different therefrom may be used as necessary.

For example, in the foregoing embodiments and Examples, the case where lithium is used as an electrode reactive substance has been described. However, the present application can be also applied to the case of using another 1A group element such as sodium Na, potassium K, or the like, a 2A group element such as magnesium Mg, calcium Ca, or the like, another light metal such as aluminum Al or the like, lithium, or an alloy of them, and similar effects can be obtained. In this instance, the anode material as described in the foregoing embodiments can be similarly used as an anode active material.

In the foregoing embodiments and Examples, the secondary battery having the winded structure has been described. However, the present application can be also similarly applied to the secondary battery having a structure in which the cathode and the anode are folded or laminated. In addition to them, the present application can be also applied to the secondary battery of what is called a coin type, a button type, a rectangular type, or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte battery comprising a cathode, an anode, an electrolyte, and a separator,
    wherein said separator is a microporous resin film of a single layer made of a resin material in which at least one kind of insulating and flame-retarding fiber is dispersed in a polyolefin resin,
    wherein said insulating and flame-retarding fiber is an aromatic polyamide fiber, and
    wherein said polyolefin resin is polyethylene, polypropylene, or a mixture of polyethylene and polypropylene, and
    wherein porosity of said separator lies within a range from 25% or more to 65% or less.

2. The non-aqueous electrolyte battery according to claim 1, wherein a content of said aromatic polyamide fiber in said separator lies within a range from 0.5 wt % or more to 50 wt % or less.

3. The non-aqueous electrolyte battery according to claim 1, wherein an open circuit voltage in a full charging state lies within a range from 4.25V or more to 4.55V or less.

4. The non-aqueous electrolyte battery according to claim 1, wherein a film thickness of said separator lies within a range from 5 µm or more to 25 µm or less.

5. The non-aqueous electrolyte battery according to claim 1, wherein air permeability of said separator lies within a range from 100 sec/100 cc or more to 600 sec/100 cc or less.

6. The non-aqueous electrolyte battery according to claim 1, wherein a piercing strength of said separator lies within a range from 100 gf or more to 1000 gf or less.

7. The non-aqueous electrolyte battery according to claim 1, wherein said anode contains carbon which can dope and dedope alkaline metal ions or alkaline earth metal ions.

8. The non-aqueous electrolyte battery according to claim 7, wherein said carbon is one selected from the group consisting of graphite, easy-graphitizable carbon, and non-easy-graphitizable carbon.

9. The non-aqueous electrolyte battery according to claim 1, wherein said anode contains a metal material which can dope and dedope alkaline metal ions or alkaline earth metal ions.

* * * * *